US011026097B2

(12) United States Patent
Xue et al.

(10) Patent No.: US 11,026,097 B2
(45) Date of Patent: Jun. 1, 2021

(54) COEXISTENCE BETWEEN SPECTRUM SHARING SYSTEMS AND ASYNCHRONOUS CHANNEL ACCESS SYSTEMS

(71) Applicant: QUALCOMM Incorporated, San Diego, CA (US)

(72) Inventors: Yisheng Xue, San Diego, CA (US); Aleksandar Damnjanovic, Del Mar, CA (US); Yongbin Wei, La Jolla, CA (US); Siddhartha Mallik, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/529,691

(22) Filed: Aug. 1, 2019

(65) Prior Publication Data

US 2020/0045556 A1 Feb. 6, 2020

Related U.S. Application Data

(60) Provisional application No. 62/714,408, filed on Aug. 3, 2018.

(51) Int. Cl.
*H04W 4/00* (2018.01)
*H04W 16/14* (2009.01)
(Continued)

(52) U.S. Cl.
CPC ....... *H04W 16/14* (2013.01); *H04W 72/1247* (2013.01); *H04W 74/04* (2013.01)

(58) Field of Classification Search
CPC ...... H04W 72/04; H04W 88/08; H04W 76/00
See application file for complete search history.

(56) References Cited

U.S. PATENT DOCUMENTS 6,529,520 B1 * 3/2003 Lee ...................... H04L 12/2801
370/442
2004/0027988 A1 * 2/2004 Billhartz ............. H04L 63/1408
370/229
(Continued)

FOREIGN PATENT DOCUMENTS

WO 2018140558 A1 8/2018

OTHER PUBLICATIONS

International Search Report and Written Opinion—PCT/US2019/044989—ISA/EPO—dated Nov. 14, 2019.
(Continued)

*Primary Examiner* — Siren Wei
(74) *Attorney, Agent, or Firm* — Qualcomm Incorporated

(57) ABSTRACT

Various aspects of the present disclosure generally relate to wireless communication. In some aspects, a device may select a plurality of channel access intervals during which the device is associated with a priority condition relative to another device for communications by the device, wherein each of the plurality of channel access intervals includes a respective contention interval and a respective transmission opportunity; and may transmit, during a contention interval of a first channel access interval of the plurality of channel access intervals, a signal that includes: channel occupancy information for the device for a first transmission opportunity of the first channel access interval, and information that identifies at least a portion of one or more subsequent channel access intervals, of the plurality of channel access intervals, associated with the device. Numerous other aspects are provided.

28 Claims, 7 Drawing Sheets

(51) Int. Cl.
H04W 74/04 (2009.01)
H04W 72/12 (2009.01)

(56) References Cited

U.S. PATENT DOCUMENTS

| | | | | |
|---|---|---|---|---|
| 2005/0111361 | A1* | 5/2005 | Hosein | H04L 47/263 370/230 |
| 2009/0040974 | A1* | 2/2009 | Goldhamer | H04W 74/02 370/329 |
| 2014/0071873 | A1* | 3/2014 | Wang | H04W 72/1284 370/311 |
| 2017/0034847 | A1* | 2/2017 | He | H04W 74/06 |
| 2018/0220325 | A1* | 8/2018 | Lee | H04W 72/10 |

OTHER PUBLICATIONS

Qualcomm Incorporated: "Deployment Scenarios for NR unlicensed", 3GPP Draft; R1-1802863 7.6.2 Deployment Scenarios for NR Unlicensed, 3rd Generation Partnership Project (3GPP), Mobile Competence Centre; 650, Route Des Lucioles; F-06921 Sophia-Antipolis Cedex; France, vol. Ran WG1, No. Athens, Greece; Feb. 26, 2018-Mar. 2, 2018, Feb. 17, 2018, XP051398276, 5 pages, Retrieved from the Internet: URL: http://www.3gpp.org/ftp/tsg%5Fran/WG1%5FRL1/TTSGR1%5F92/Docs/ [retrieved on Feb. 17, 2018] section 6; pp. 4-5.

* cited by examiner

COEXISTENCE BETWEEN SPECTRUM SHARING SYSTEMS AND ASYNCHRONOUS CHANNEL ACCESS SYSTEMS

CROSS-REFERENCE TO RELATED APPLICATIONS UNDER 35 U.S.C. § 119

This application claims priority to U.S. Provisional Patent Application No. 62/714,408, filed on Aug. 3, 2018, entitled "COEXISTENCE BETWEEN NEW RADIO SPECTRUM SHARING SYSTEMS AND ASYNCHRONOUS CHANNEL ACCESS SYSTEMS," which is hereby expressly incorporated by reference herein.

FIELD OF THE DISCLOSURE

Aspects of the present disclosure generally relate to wireless communication, and more particularly to techniques and apparatuses for coexistence between spectrum sharing (e.g., New Radio spectrum sharing (NR-SS) and/or the like) systems and asynchronous channel access systems.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication, performed by a device, may include selecting a plurality of channel access intervals during which the device is associated with a priority condition relative to another device for communications by the device, wherein each of the plurality of channel access intervals includes a respective contention interval and a respective transmission opportunity; and transmitting, during a contention interval of a first channel access interval of the plurality of channel access intervals, a signal that includes: channel occupancy information for the device for a first transmission opportunity of the first channel access interval, and information that identifies at least a portion of one or more subsequent channel access intervals, of the plurality of channel access intervals, associated with the device.

In some aspects, a device for wireless communication may include memory and one or more processors configured to select a plurality of channel access intervals during which the device is associated with a priority condition relative to another device for communications by the device, wherein each of the plurality of channel access intervals includes a respective contention interval and a respective transmission opportunity; and transmit, during a contention interval of a first channel access interval of the plurality of channel access intervals, a signal that includes: channel occupancy information for the device for a first transmission opportunity of the first channel access interval, and information that identifies at least a portion of one or more subsequent channel access intervals, of the plurality of channel access intervals, associated with the device.

In some aspects, a non-transitory computer-readable medium may store one or more instructions for wireless communication. The one or more instructions, when executed by one or more processors of a device, may cause the one or more processors to select a plurality of channel access intervals during which the device is associated with a priority condition relative to another device for communications by the device, wherein each of the plurality of channel access intervals includes a respective contention interval and a respective transmission opportunity; and transmit, during a contention interval of a first channel access interval of the plurality of channel access intervals, a signal that includes: channel occupancy information for the device for a first transmission opportunity of the first channel access interval, and information that identifies at least a portion of one or more subsequent channel access intervals, of the plurality of channel access intervals, associated with the device.

In some aspects, an apparatus for wireless communication may include means for selecting a plurality of channel access intervals during which the apparatus is associated with a priority condition relative to another device for communications by the device, wherein each of the plurality of channel access intervals includes a respective contention interval and a respective transmission opportunity; and means for transmitting, during a contention interval of a first channel access interval of the plurality of channel access intervals, a signal that includes: channel occupancy information for the apparatus for a first transmission opportunity of the first channel access interval, and information that identifies at least a portion of one or more subsequent channel access intervals, of the plurality of channel access intervals, associated with the apparatus.

In some aspects, a method for wireless communication, performed by an asynchronous channel access device, may include receiving, during a first contention interval of a first channel access interval of a plurality of channel access intervals during which the asynchronous channel access device is not associated with a priority condition for communications by the asynchronous channel access device, a signal that includes: channel occupancy information for a spectrum sharing device for a first transmission opportunity of the first channel access interval, and information that identifies at least a portion of a subsequent channel access interval of the plurality of channel access intervals; and coordinating one or more communications of the asynchronous channel access device to end prior to a start of the subsequent channel access interval.

In some aspects, an asynchronous channel access device for wireless communication may include memory and one or more processors configured to receive, during a first contention interval of a first channel access interval of a plurality of channel access intervals during which the asynchronous channel access device is not associated with a priority condition for communications by the asynchronous channel access device, a signal that includes: channel occupancy information for a spectrum sharing device for a first transmission opportunity of the first channel access interval, and information that identifies at least a portion of a subsequent channel access interval of the plurality of channel access intervals; and coordinate one or more communications of the asynchronous channel access device to end prior to a start of the subsequent channel access interval.

In some aspects, a non-transitory computer-readable medium may store one or more instructions for wireless communication. The one or more instructions, when executed by one or more processors of an asynchronous channel access device, may cause the one or more processors to receive, during a first contention interval of a first channel access interval of a plurality of channel access intervals during which the asynchronous channel access device is not associated with a priority condition for communications by the asynchronous channel access device, a signal that includes: channel occupancy information for a spectrum sharing device for a first transmission opportunity of the first channel access interval, and information that identifies at least a portion of a subsequent channel access interval of the plurality of channel access intervals; and coordinate one or more communications of the asynchronous channel access device to end prior to a start of the subsequent channel access interval.

In some aspects, an apparatus for wireless communication may include means for receiving, during a first contention interval of a first channel access interval of a plurality of channel access intervals during which the apparatus is not associated with a priority condition for communications by the apparatus, a signal that includes: channel occupancy information for a spectrum sharing device for a first transmission opportunity of the first channel access interval, and information that identifies at least a portion of a subsequent channel access interval of the plurality of channel access intervals; and means for coordinating one or more communications of the apparatus to end prior to a start of the subsequent channel access interval.

Aspects generally include a method, apparatus, system, computer program product, non-transitory computer-readable medium, user equipment, base station, spectrum sharing device, New Radio spectrum sharing device, asynchronous channel access device, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It should be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
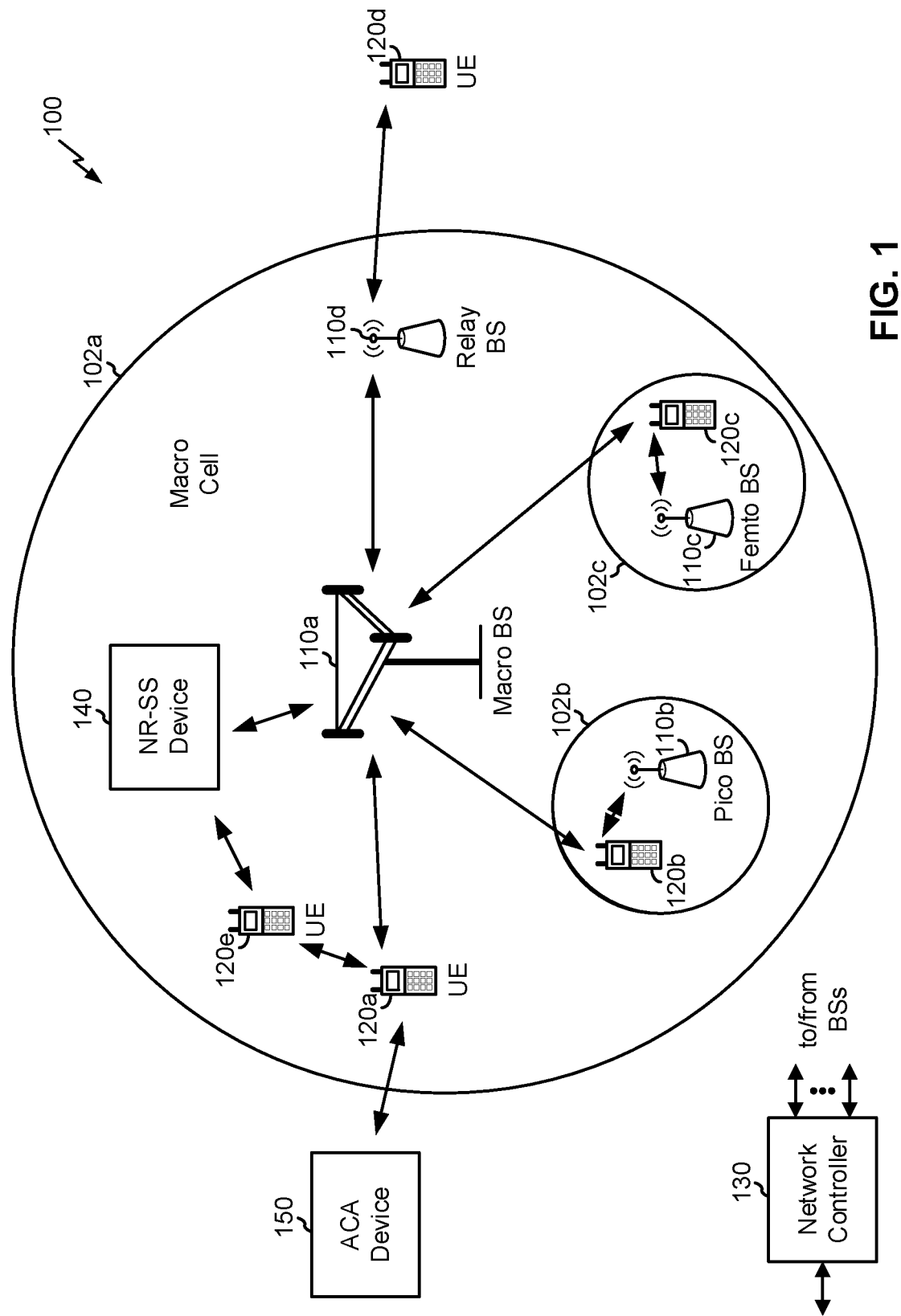
FIG. 1 is a block diagram conceptually illustrating an example of a wireless communication network, in accordance with various aspects of the present disclosure.

A synchronous channel access technology, such as a New Radio spectrum sharing (NR-SS) technology or another type of spectrum sharing technology, has certain performance benefits compared to an asynchronous channel access technology, such as a wireless local area network (WLAN) technology (e.g., a Wi-Fi technology and/or the like), a licensed-assisted access (LAA) technology, an LTE for unlicensed spectrum (LTE-U) technology, a New Radio for unlicensed spectrum (NR-U) technology, and/or the like. For example, a synchronous channel access technology may leverage intra-operator and/or inter-operator network planning, may provide better fairness than an asynchronous channel access technology, may require less signaling overhead than an asynchronous channel access technology, and/or the like. However, due to difficulties in inter-technology communication, differences in protocols, differences in channel access procedures, differences in channel contention procedures, and/or the like, designing a communication scheme that permits coexistence between synchronous channel access technologies and asynchronous channel access technologies is difficult.

Some techniques and apparatuses described herein permit coexistence between synchronous channel access technologies and asynchronous channel access technologies, such as Wi-Fi, LTE-U, NR-U, and/or the like, in a manner that is fair to devices of both types of technologies (e.g., that provides fair opportunity for devices of different technologies to gain channel access and/or communicate via a shared channel, such as a channel of unlicensed spectrum), that supports inter-technology communication, that reduces interference between such devices, and/or the like. It should be noted that the techniques and apparatuses described herein can be applied for any combination of synchronous and asynchronous channel access technologies (e.g., between devices using synchronous channel access technologies, devices using asynchronous channel access technologies, or devices using a combination of synchronous and asynchronous channel access technologies).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As further shown in FIG. 1, wireless network 100 may include one or more NR-SS devices 140. An NR-SS device 140 may include any type of device capable of communicating using a synchronous channel access technology (e.g., a communication scheme, protocol, standard, and/or the like), such as an NR-SS technology or another synchronous channel access technology other than NR-SS. For example, an NR-SS device 140 may be a base station 110, a UE 120, and/or the like. Additionally, or alternatively, wireless network 100 may include one or more asynchronous channel access (ACA) devices 150. An ACA device 150 may include any type of device capable of communicating using an ACA technology, such as a wireless local area network (WLAN) technology (e.g., a Wi-Fi technology and/or the like), a licensed-assisted access (LAA) technology, an LTE for unlicensed spectrum (LTE-U) technology, a New Radio for unlicensed spectrum (NR-U) technology, and/or the like. For example, an ACA device 150 may be a base station 110, a UE 120, a WLAN access point (e.g., a Wi-Fi access point), and/or the like.

As indicated above, FIG. 1 is provided as an example. Other examples may differ from what is described with regard to FIG. 1.

Figure 2:
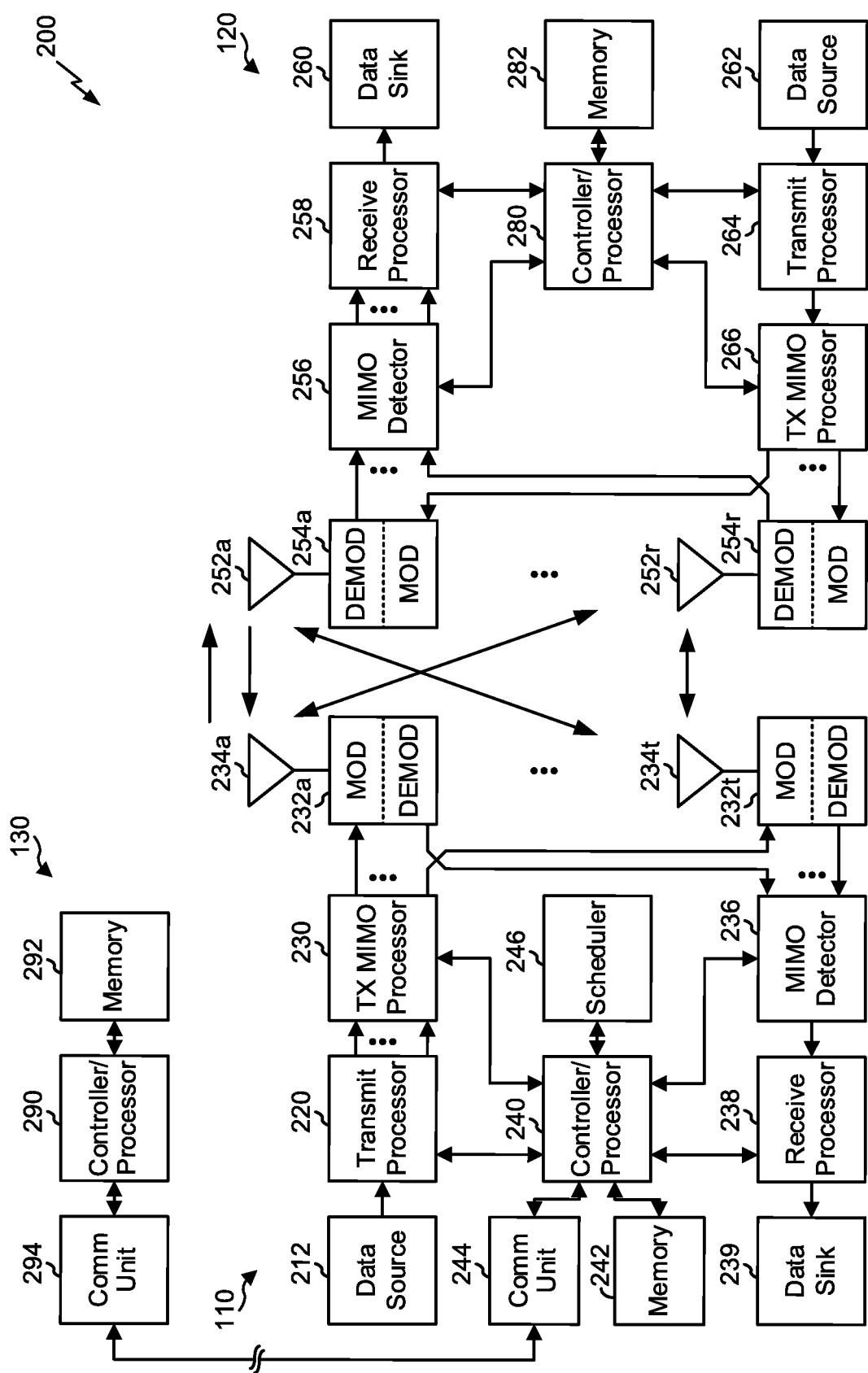
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with coexistence between spectrum sharing systems and asynchronous channel access systems, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink. In some aspects, an NR-SS device 140 and/or an ACA device 150 may include one or more components described in connection with FIG. 2 and/or similar components. For example, NR-SS device 140 and/or ACA device 150 may include a memory, one or more processors, one or more schedulers, one or more transmission components, one or more reception components, one or more antennas, and/or the like, the same as or similar to those described in connection with FIG. 2.

Figure 6:
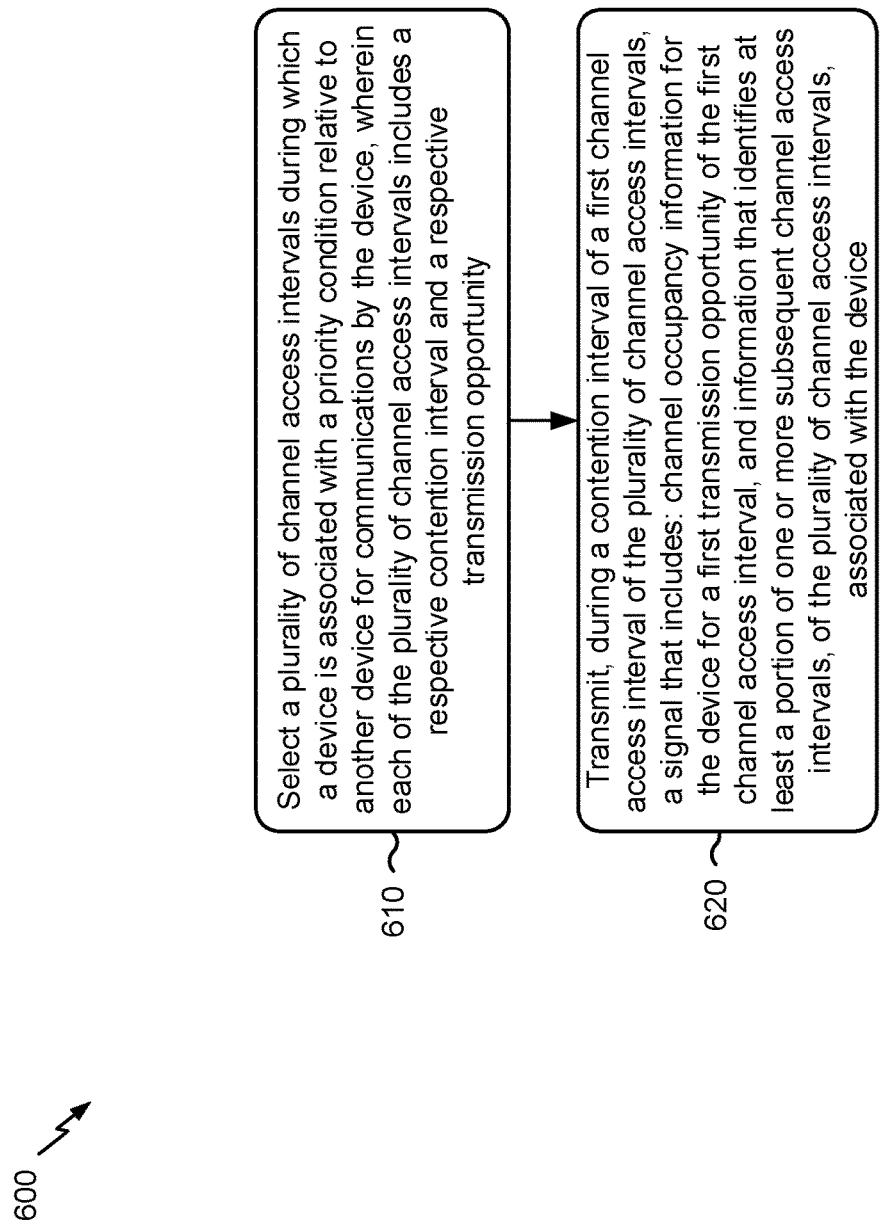
FIGS. 6 and 7 are diagrams illustrating example processes relating to coexistence between New Radio spectrum sharing (NR-SS) systems and asynchronous channel access systems, in accordance with various aspects of the present disclosure.
Figure 7:
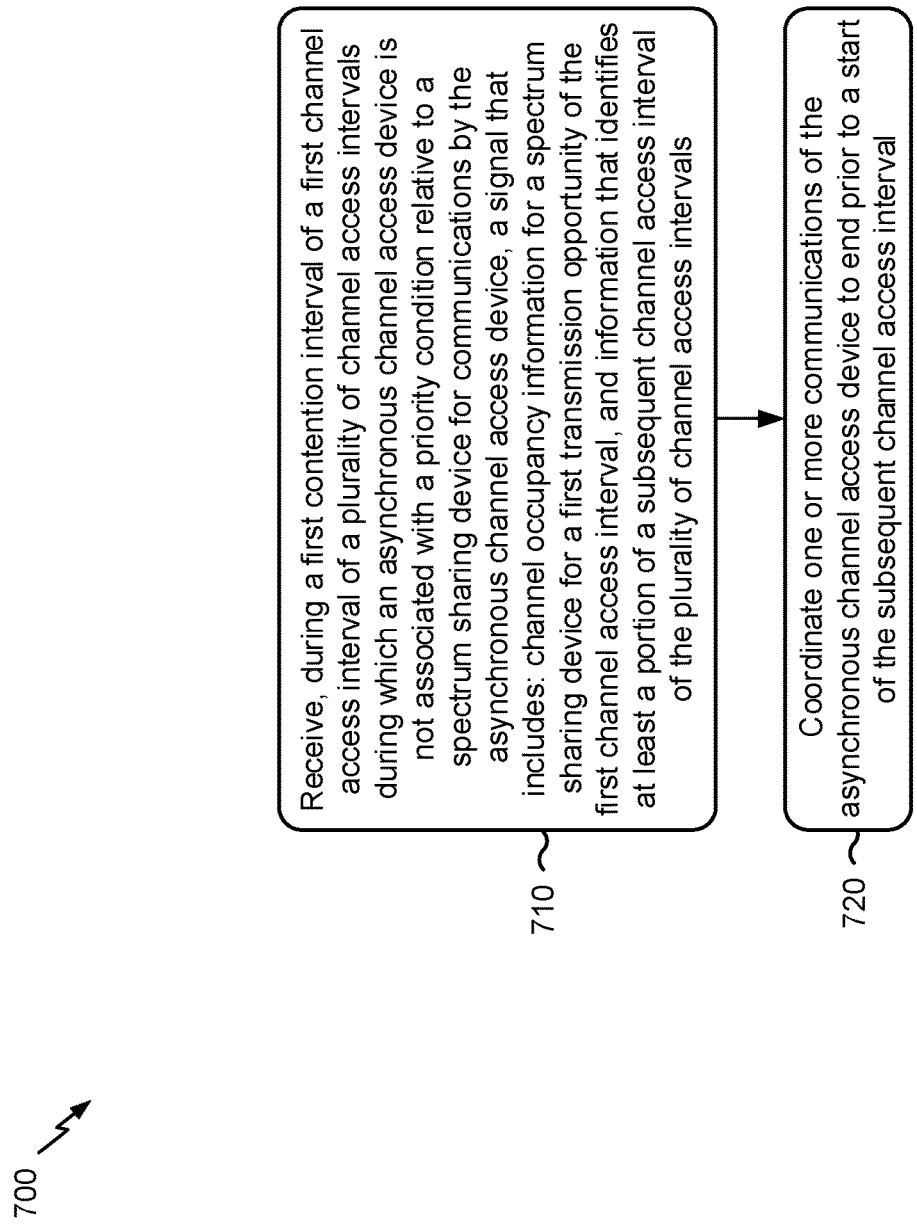

The stored program codes, when executed by controller/processor 240, controller/processor 280 and/or other processor(s) and/or modules of base station 110, UE 120, NR-SS device 140, and/or ACA device 150, may cause the base station 110, UE 120, NR-SS device 140, and/or ACA device 150 to perform operations described with respect to process 600 of FIG. 6, process 700 of FIG. 7, and/or other processes as described herein. A scheduler 246 may schedule UEs for data transmission on the downlink and/or uplink.

In some aspects, an apparatus or device (e.g., base station 110, UE 120, NR-SS device 140, and/or the like) may include means for selecting a plurality of channel access intervals during which the device is associated with a priority condition relative to another device for communications by the device, wherein each of the plurality of channel access intervals includes a respective contention interval and a respective transmission opportunity; means for transmitting, during a contention interval of a first channel access interval of the plurality of channel access intervals, a signal that includes: channel occupancy information for the apparatus for a first transmission opportunity of the first channel access interval, and information that identifies at least a portion of one or more subsequent channel access intervals, of the plurality of channel access intervals, associated with the apparatus; means for attempting to access a channel, during a low priority interval, after a maximum contention window time, associated with asynchronous channel access during the low priority interval, has elapsed; means for attempting to access a channel, during the low priority interval, using a higher clear channel assessment deferral value than an asynchronous channel access device; and/or the like. In some aspects, such means may include one or more components of base station 110, UE 120, NR-SS device 140, and/or the like described in connection with FIG. 2.

Additionally, or alternatively, an apparatus or device (e.g., base station 110, UE 120, ACA device 150, and/or the like) may include means for receiving, during a first contention interval of a first channel access interval of a plurality of channel access intervals during which the asynchronous channel access device is not associated with a priority condition for communications by the asynchronous channel access device, a signal that includes: channel occupancy information for a spectrum sharing device for a first transmission opportunity of the first channel access interval, and information that identifies at least a portion of a subsequent channel access interval of the plurality of channel access intervals; means for coordinating one or more communications of the apparatus to end prior to a start of the subsequent channel access interval; and/or the like. In some aspects, such means may include one or more components of base station 110, UE 120, ACA device 150, and/or the like described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3:
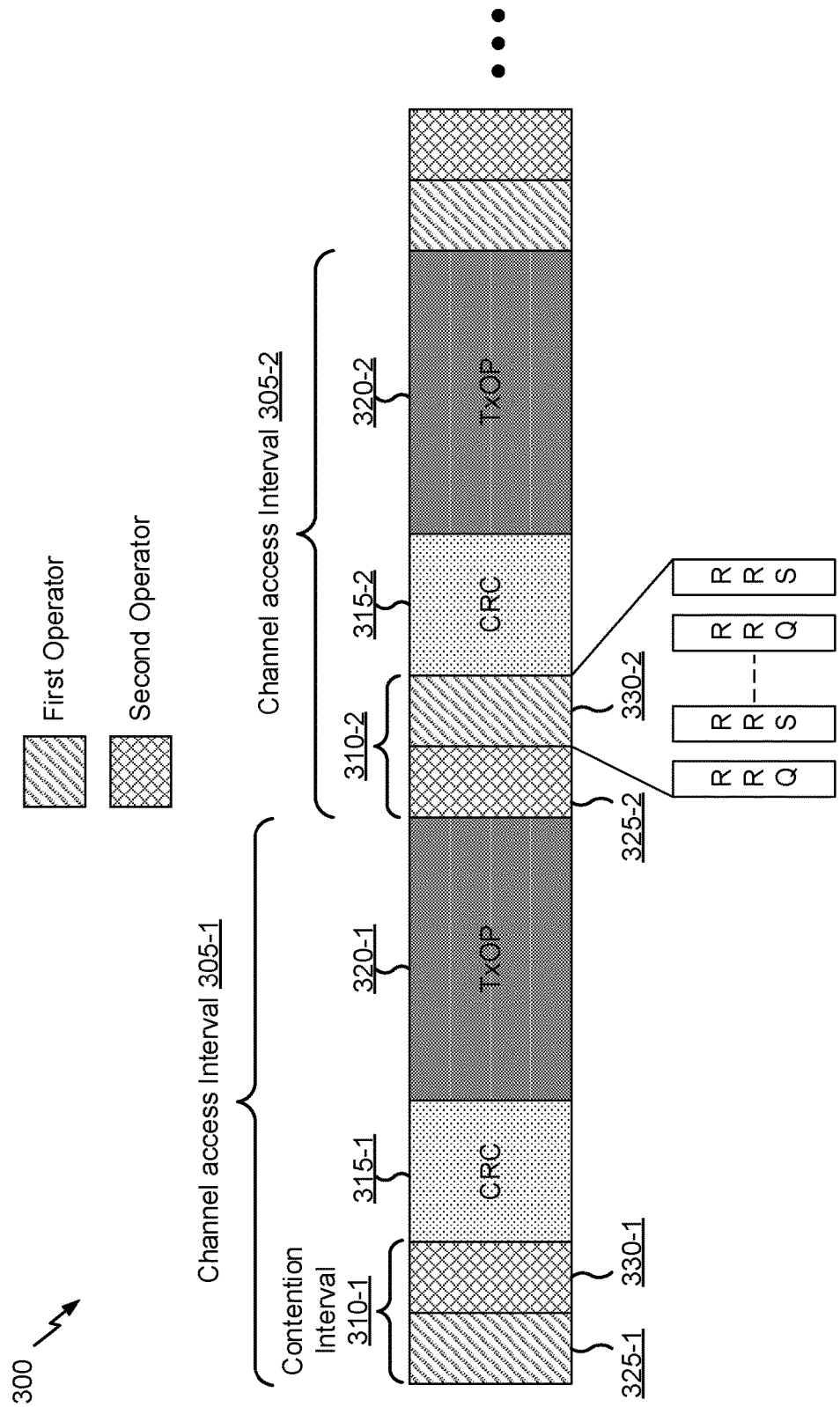
FIG. 3 is a diagram illustrating an example of channel access intervals of a New Radio spectrum sharing (NR-SS) system, in accordance with various aspects of the present disclosure.

FIG. 3 is a diagram illustrating an example 300 of channel access intervals of a New Radio spectrum sharing (NR-SS) system, in accordance with various aspects of the present disclosure.

As shown in FIG. 3, a channel access interval 305 for a synchronous channel access technology, such as NR-SS or a similar technology, may include a contention interval 310, a coordinated rate control (CRC) interval 315, and a transmission opportunity (TxOP) 320. The contention interval 310 may occur at the beginning of the channel access interval 305, and may be used for various devices (e.g., NR-SS devices, such as base stations 110, UEs 120, NR-SS device 140, and/or the like) to contend for access to a channel. In some aspects, different operators and/or different devices of those operators may be associated with different priorities, and the priorities of those operators and/or devices may change across different channel access intervals 305 to provide fair access and coexistence to all operators and/or devices. When referring to a first device and a second device, a device associated with a higher priority of the first device and the second device may be referred to as being associated with a priority condition relative to the other device. For example, when the first device is associated with a higher priority than the second device, the first device is associated with a priority condition relative to the second device, and when the second device is associated with a higher priority than the first device, the second device is associated with a priority condition relative to the first device.

For example, a first device, such as a first base station 110 associated with a first network operator, may have higher priority than a second device, such as a second base station 110 associated with a second network operator, in a first channel access interval 305-1. In this case, an earlier portion 325-1 of a first contention interval 310-1 of the first channel access interval 305-1 may be reserved for the first base station 110, and a later portion 330-1 of the first contention interval 310-1 may be reserved for the second base station 110. The first base station 110 may transmit a reservation request (RRQ) in the earlier portion 325-1 (e.g., with a randomly selected offset from the start of the earlier portion 325-1) to reserve some or all of a first transmission opportunity 320-1, of the first channel access interval 305-1, for communications of the first base station 110 (e.g., uplink communications, downlink communications, sidelink communications, and/or the like). In some aspects, the RRQ may be intended for a UE 120 or a similar type of device, and the UE 120 may respond with a reservation response (RRS) indicating whether the UE 120 is available to receive communications from the first base station 110 in the first transmission opportunity 320-1.

In a second channel access interval 305-2, priorities of the operators and/or devices may change, and the second base station 110 may have a higher priority than the first base station 110. In this case, an earlier portion 325-2 of a second contention interval 310-2 of the second channel access interval 305-2 may be reserved for the second base station 110, and a later portion 330-2 of the second contention interval 310-2 may be reserved for the first base station 110. The second base station 110 may transmit an RRQ in the earlier portion 325-2 to reserve some or all of a second transmission opportunity 320-2, of the second channel access interval 305-2, for communications of the second base station 110. As described above, the RRQ may be intended for a UE 120 or a similar type of device, and the UE 120 may respond with an RRS indicating whether the UE 120 is available to receive communications from the second base station 110 in the second transmission opportunity 320-2.

In some aspects, a lower priority device may listen for RRQs and/or RRSs from higher priority devices during an earlier portion 325 of a contention interval 310. In some aspects, if the lower priority device detects an RRQ and/or an RRS from a higher priority device during the earlier portion 325, then the lower priority device may refrain from transmitting in a corresponding transmission opportunity 320. However, if the lower priority device does not detect an RRQ and/or an RRS from a higher priority device during the earlier portion 325, then the lower priority device may transmit and/or receive in the corresponding transmission opportunity 320, and may transmit an RRQ and/or an RRS to reserve resources of the transmission opportunity 320 and/or indicate an availability to receive communications in the transmission opportunity 320. Although two contention interval portions 325, 330 are shown as an example, a different number of contention interval portions may be used (e.g., for a different number of network operators, a different number of priority levels associated with NR-SS, and/or the like).

As further shown, a coordinated rate control interval 315 may follow a contention interval 310 within a channel access interval 305. In the coordinated rate control interval 315, all devices that have gained access to the channel for the transmission opportunity 320, within the channel access interval 305, may coordinate a rate at which communications of the devices are to be transmitted, so as to achieve efficient use of the channel without overloading the channel and causing excessive interference.

As indicated above, FIG. 3 is provided as an example. Other examples may differ from what is described with regard to FIG. 3.

Figure 4:
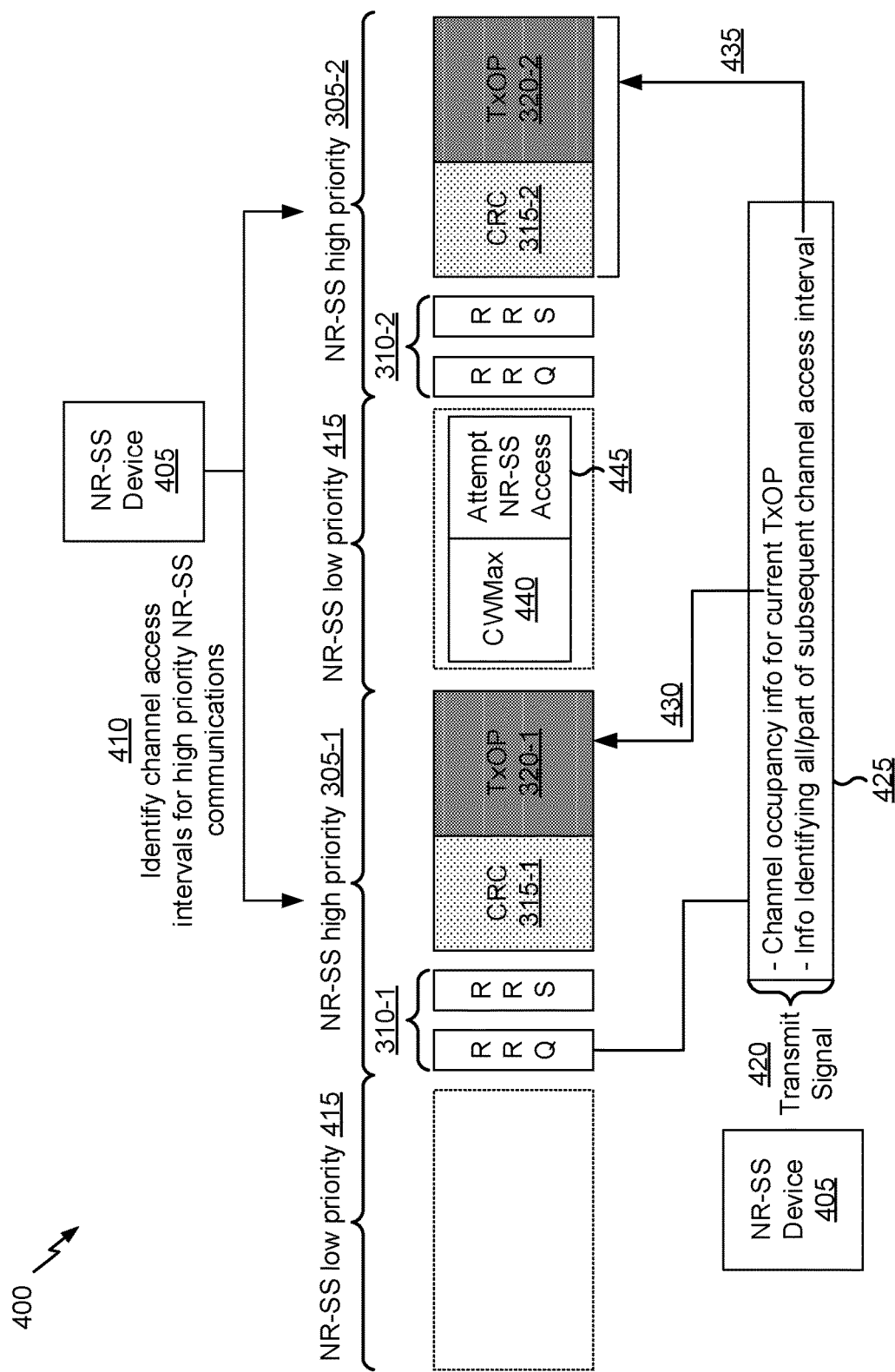
FIGS. 4 and 5 are diagrams illustrating examples of operations relating to coexistence between New Radio spectrum sharing (NR-SS) systems and asynchronous channel access systems, in accordance with various aspects of the present disclosure.

FIG. 4 is a diagram illustrating an example 400 of operations relating to coexistence between New Radio spectrum sharing (NR-SS) systems and asynchronous channel access systems, in accordance with various aspects of the present disclosure.

As shown in FIG. 4, an NR-SS device 405 may perform various operations that support coexistence between NR-SS systems and asynchronous channel access systems, such as WLAN (e.g., Wi-Fi) systems, LTE-U systems, NR-U systems, and/or the like. The NR-SS device 405 may include any type of device capable of communicating using spectrum sharing technology (e.g., using spectrum sharing protocols or procedures such as NR-SS protocols, procedures, and/or the like), such as a base station 110, a UE 120, NR-SS device 140, and/or the like.

As shown by reference number 410, the NR-SS device 405 may identify multiple channel access intervals 305 during which the NR-SS device 405 has high priority (e.g., is associated with a priority condition) for NR-SS communications (e.g., shown as NR-SS high priority). During a channel access interval 305 with high priority for NR-SS communications, communications of an asynchronous channel access technology (e.g., Wi-Fi and/or the like) may receive low priority (e.g., are not associated with the priority condition). As shown, and as described above in connection with FIG. 3, each channel access interval 305 may include a respective contention interval 310, a respective coordinated rate control interval 315, and/or a respective transmission opportunity 320.

As further shown, the multiple channel access intervals 305 may be noncontiguous in time. In some aspects, each consecutive pair of channel access intervals 305 (e.g., occurring without any intervening channel access intervals 305 with high priority for NR-SS) may be separated by a low priority interval 415 during which the NR-SS device 405 has low priority for NR-SS communications (e.g., and during which communications of an asynchronous channel access technology receive high priority).

As shown by reference number 420, the NR-SS device 405 may transmit a signal 425 during a contention interval 310 of a channel access interval 305. For example, the NR-SS device 405 may transmit the signal 425 during a first contention interval 310-1 of a first channel access interval 305-1 associated with high priority for NR-SS communications. The signal 425 may include, for example, an RRQ signal, an RRS signal, a request-to-send (RTS) signal, a clear-to-send (CTS) signal, a clear-to-send-to-self (CTS2S) signal, and/or the like. In some aspects, the signal 425 may include characteristics and/or fields of one or more of the above types of signals. For example, the signal 425 may include a modified RRQ (mRRQ) signal, a modified RRS (mRRS) signal, a modified RTS (mRTS) signal, a modified CTS (mCTS) signal, a modified CTS2S (mCTS2S) signal, and/or the like.

Additionally, or alternatively, the signal 425 may be configured to be decodable by devices that use a synchronous channel access technology (e.g., an NR-SS technology and/or the like) to communicate and devices that use an asynchronous channel access technology (e.g., a WLAN technology, an LAA technology, an LTE-U technology, an NR-U technology, and/or the like) to communicate. For example, the signal 425 may be configured to include one or more fields of an asynchronous channel contention signal (e.g., an RTS signal, a CTS signal, a CTS2S signal, and/or the like), all fields of an asynchronous channel contention signal, a same arrangement of fields as an asynchronous channel contention signal, and/or the like. In some aspects, additional information, such as channel occupancy information and/or information that identifies at least a portion of one or more subsequent channel access intervals 305 (e.g., as described below) may be appended to the asynchronous channel contention signal (e.g., in one or more additional fields).

As shown by reference number 430, the signal 425 may include channel occupancy information, associated with the NR-SS device 405, for a first transmission opportunity 320-1 of the first channel access interval 305-1. In some aspects, a signal 425 transmitted in a contention interval 310 of a specific channel access interval 305 may include channel occupancy information for a transmission opportunity 320 of that specific channel access interval 305 (e.g., a transmission opportunity 320 immediately subsequent to the contention interval 310, with no intervening transmission opportunities 320).

The channel occupancy information may include, for example, an indication of whether the NR-SS device 405 is requesting channel access during a transmission opportunity 320, a quantity of resources requested by the NR-SS device 405 during the transmission opportunity 320, an amount of time that the NR-SS device 405 requests to transmit during the transmission opportunity 320, and/or the like. As described in more detail below in connection with FIG. 5, an asynchronous channel access device (and/or other NR-SS devices 405) may receive the channel occupancy information for the channel access interval 305, and may refrain from interfering with communications of the NR-SS device 405 during the transmission opportunity 320 of the channel access interval 305.

In some aspects, the signal 425 may identify a coordinated rate control interval 315 of a channel access interval 305 in which the signal 425 is transmitted. For example, if the signal 425 is transmitted in the first contention interval 310-1, then the signal 425 may identify a location of a first coordinated rate control interval 315-1. In this way, an asynchronous channel access device that receives the signal 425 may refrain from transmitting during the coordinated rate control interval 315, thereby reducing interference. In some aspects, the channel occupancy information may indicate that the NR-SS device 405 is not requesting channel access during a transmission opportunity 320. However, other NR-SS devices 405 may request channel access during the transmission opportunity 320, and may perform coordinated rate control during the coordinated rate control interval 315. By including the location of the coordinated rate control interval 315 in the signal 425, the asynchronous channel access device may be notified of the location, and may avoid interfering with such coordinated rate control operations.

As shown by reference number 435, the signal 425 may include information that identifies at least a portion of (e.g., some of or all of) a subsequent channel access interval 305 for high priority NR-SS communications. For example, a signal 425 transmitted during a first contention interval 310-1 of a first channel access interval 305-1 may include information that identifies a location (e.g., in time) of some or all of a second channel access interval 305-2. The second channel access interval 305-2 may occur after (e.g., later in time than) the first channel access interval 305-1. As described in more detail below in connection with FIG. 5, an asynchronous channel access device may receive the information that identifies some or all of a subsequent channel access interval 305, and may refrain from interfering with a contention interval 310 and/or one or more other portions of the subsequent channel access interval 305.

In some aspects, the signal 425 may indicate only a single subsequent channel access interval 305 (e.g., subsequent to the channel access interval 305 in which the signal 425 is transmitted). In this case, the single subsequent channel access interval 305 may be a next consecutive channel access interval 305 that occurs closest in time subsequent to a channel access interval 305 in which the signal 425 is transmitted (e.g., with no intervening channel access intervals 305 for high priority NR-SS communications). For example, if the NR-SS device 405 transmits the signal 425 in the first contention interval 310-1 of the first channel access interval 305-1, then the signal 425 may identify all or a portion of only the second channel access interval 305-2, without identifying all or a portion of any other channel access intervals (e.g., that occur after the second channel access interval 305-2). In this way, a size of the signal 425 and corresponding overhead may be reduced.

In some aspects, the signal 425 may identify multiple subsequent channel access intervals 305 (or portions of multiple subsequent channel access intervals 305). For example, the signal 425 may indicate locations (e.g., in time) of the multiple channel access intervals 305. Additionally, or alternatively, the multiple channel access intervals 305 may occur with a specific periodicity and/or may have a specific size (e.g., a length of time occupied by a channel access interval 305), and the specific periodicity and/or the specific size may be indicated in the signal 425 to identify the multiple subsequent channel access intervals 305.

In some aspects, the signal 425 may identify an entire location of a subsequent channel access interval 305 (e.g., all of the time and/or frequency resources of the subsequent channel access interval 305). In some aspects, the entire location may include the subsequent contention interval 310, the subsequent coordinated rate control interval 315, and the subsequent transmission opportunity 320 included in the subsequent channel access interval 305. In this way, an asynchronous channel access device that receives the signal 425 may operate with finer granularity (e.g., by avoiding particular portions of the subsequent channel access interval 305), which may lead to more efficient use of the channel.

Alternatively, the signal 425 may identify one or more portions of the subsequent channel access interval 305. A portion may include, for example, a contention interval 310, a coordinated rate control interval 315, or a transmission opportunity 320. For example, the signal 425 may identify only a location of a subsequent contention interval 310 of the subsequent channel access interval 305 (e.g., without identifying a location of the subsequent coordinated rate control interval 315 and the subsequent transmission opportunity 320). In this way, an asynchronous channel access device that receives the signal 425 may refrain from transmitting during the subsequent contention interval 310, which may reduce interference, and/or may listen for subsequent signals 425 during the subsequent contention interval 310.

As shown by reference number 440, a low priority interval 415, during which NR-SS communications have low priority and communications of an asynchronous channel access technology have high priority, may include a contention window. In some aspects, the NR-SS device 405 may be configured to refrain from attempting to access the channel during the contention window (e.g., in a similar way that an asynchronous channel access device may be configured to refrain from attempting to access the channel during the contention interval 310).

In some aspects, the contention window may have a variable size, ranging from a minimum contention window time (CWmin) to a maximum contention window time (CWmax). In this case, the NR-SS device 405 may be configured to refrain from attempting to access the channel before the maximum contention window time has elapsed.

As shown by reference number 445, in some aspects, the NR-SS device 405 may attempt to access the channel, during the low priority interval 415, after the maximum contention window time has elapsed. For example, the NR-SS device 405 may listen for asynchronous channel contention signals (e.g., RTS, CTS, CTS2S, and/or the like), and may selectively access the channel after the contention window based at least in part on listening for the asynchronous channel contention signals. For example, the NR-SS device 405 may access the channel if the channel is clear, and may refrain from accessing the channel if the channel is not clear.

Additionally, or alternatively, the NR-SS device 405 may attempt to access the channel, during the low priority interval 415, using a higher clear channel assessment (CCA) deferral value than an asynchronous channel access device. The CCA deferral value may define a length of time that a device is to wait to perform a subsequent CCA after a prior CCA fails. A higher CCA deferral value may indicate that the device is required to wait for a longer time than a lower CCA deferral value. Thus, by configuring the NR-SS device 405 with a higher CCA than an asynchronous channel access device and/or by configuring the NR-SS device 405 to refrain from transmitting during the contention window, the low priority interval 415 may be made low priority for NR-SS communications, and may be made high priority for communications of an asynchronous channel access device. However, the NR-SS device 405 may opportunistically communicate during the low priority interval 415 using a listen-before-talk (LBT) procedure to defer to asynchronous channel access devices.

As indicated above, FIG. 4 is provided as an example. Other examples may differ from what is described with regard to FIG. 4. Furthermore, while the operations in FIG. 4 are described as being performed by a synchronous channel access device (such as an NR-SS device 405) and an asynchronous channel access device, the operations described in FIG. 4 may be performed by any combination of synchronous and asynchronous channel access devices.

Figure 5:
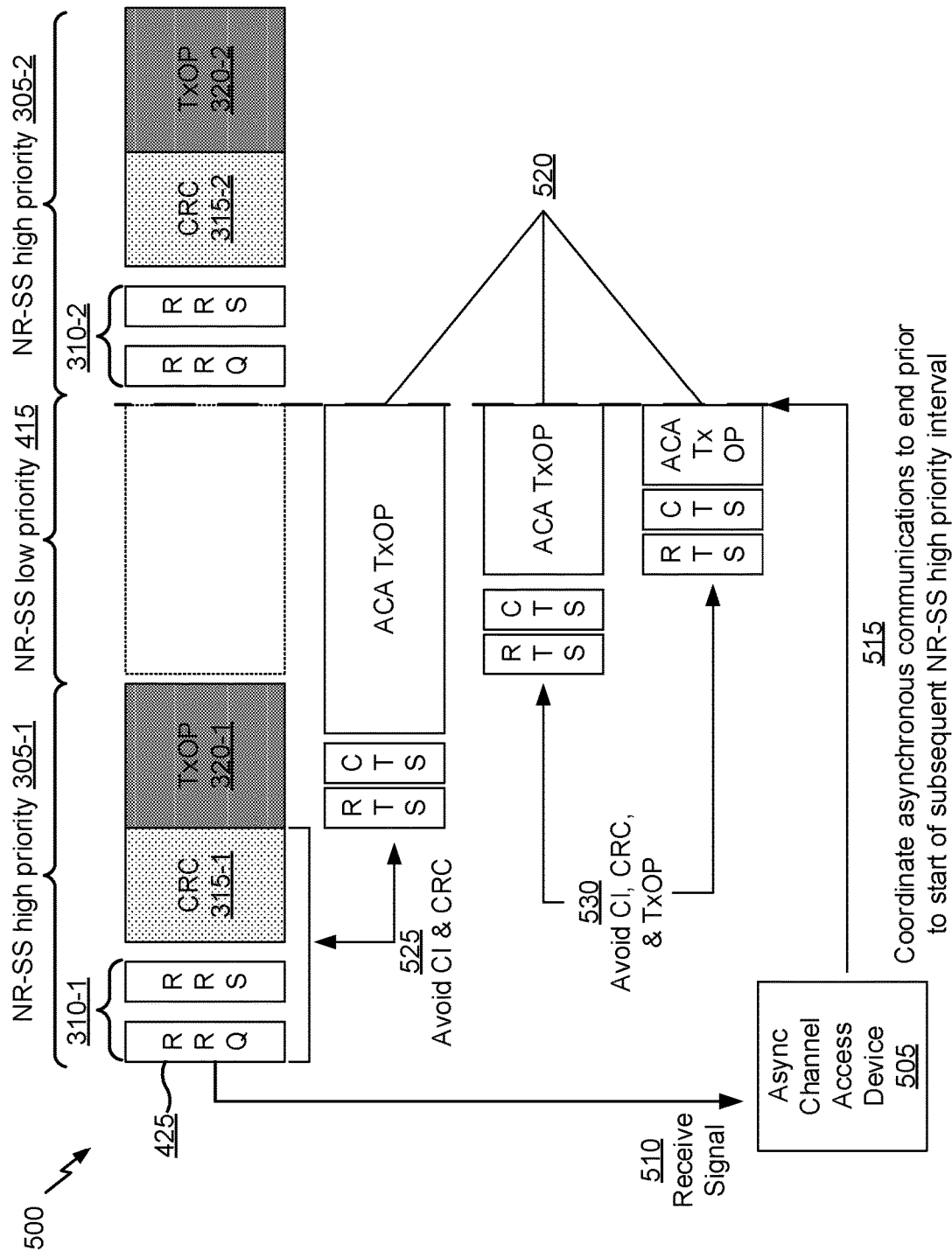

FIG. 5 is a diagram illustrating another example 500 of operations relating to coexistence between New Radio spectrum sharing (NR-SS) systems and asynchronous channel access systems, in accordance with various aspects of the present disclosure.

As shown in FIG. 5, an asynchronous channel access (ACA) device 505 may perform various operations that support coexistence between NR-SS systems and asynchronous channel access systems, such as WLAN (e.g., Wi-Fi) systems, LTE-U systems, NR-U systems, and/or the like. The ACA device 505 may include any type of device capable of communicating using an asynchronous channel access technology (e.g., using protocols, procedures, and/or the like of WLAN, Wi-Fi, LAA, LTE-U, NR-U, and/or the like), such as a base station 110, a UE 120, an ACA device 150, a WLAN access point (e.g., a Wi-Fi access point), and/or the like.

As shown by reference number 510, the ACA device 505 may receive a signal 425 from an NR-SS device 405, as described above in connection with FIG. 4. As shown, the signal 425 may be received during a first contention interval 310-1 of a first channel access interval 305-1 of multiple channel access intervals 305. During the channel access intervals 305, the ACA device 505 may have low priority for asynchronous channel access communications (and the NR-SS device 405 may have high priority for NR-SS communications), as described above in connection with FIG. 4. As further described above in connection with FIG. 4, a pair of consecutive channel access intervals 305 may be separated by a low priority interval 415 during which the NR-SS device 405 has low priority for NR-SS communications, and during which the ACA device 505 has high priority for asynchronous channel access communications.

As described above in connection with FIG. 4, the signal 425 may include channel occupancy information for the NR-SS device 405 for a first transmission opportunity 320-1 of the first channel access interval 305-1. Additionally, or alternatively, the signal 425 may include information that identifies at least a portion (e.g., some or all) of a subsequent channel access interval 305-2 of the multiple channel access intervals 305. Although the signal 425 is shown as an RRQ signal, the signal 425 may be one or more other signals as described above in connection with FIG. 4. For example, the signal 425 may be configured to be decodable by one or more NR-SS devices 405 that use an NR-SS technology to communicate, and one or more ACA devices 505 that use an asynchronous channel access technology to communicate.

In some aspects, the information that identifies at least the portion of the subsequent channel access interval 305-2 may identify a starting location (e.g., in time) of the subsequent channel access interval 305-2, an ending location (e.g., in time) of the subsequent channel access interval 305-2, a starting location of a subsequent contention interval 310-2 included in the subsequent channel access interval 305-2, an ending location of the subsequent contention interval 310-2 a starting location of a subsequent coordinated rate control (CRC) interval 315-2 included in the subsequent channel access interval 305-2, an ending location of the subsequent CRC interval 315-2, a starting location of a subsequent transmission opportunity 320-2 included in the subsequent channel access interval 305-2, an ending location of the subsequent transmission opportunity 320-2, and/or the like. In this way, the ACA device 505 may refrain from transmitting in one or more of these portions of the subsequent channel access interval 305-2.

As shown by reference number 515, the ACA device 505 may coordinate (e.g., configure) one or more communications (e.g., ACA communications, such as WLAN communications, Wi-Fi communications, LAA communications, LTE-U communications, NR-U communications, and/or the like) of the ACA device 505 to end prior to a start of the subsequent channel access interval 305-2. Additionally, or alternatively, the ACA device 505 may coordinate one or more communications of the ACA device 505 to end prior to a start of the subsequent contention interval 310-2. For example, as shown by reference number 520, regardless of when the ACA device 505 starts transmitting in the first channel access interval 305-1 and/or a low priority interval 415 between the first channel access interval 305-1 and the subsequent channel access interval 305-2, the ACA device 505 may configure a transmission to end prior to a start of the subsequent channel access interval 305-2. Although a single subsequent channel access interval 305 is shown, in some aspects, the signal 425 may identify multiple subsequent channel access intervals 305, and the ACA device 505 may configure transmissions to end prior to respective starts of each subsequent channel access interval 305.

In some aspects, the signal 425 may identify the subsequent contention interval 310-2, such as by identifying a starting location and an ending location (e.g., in time) of the subsequent contention interval 310-2. In some aspects, the ACA device 505 may coordinate (e.g., configure) one or more communications of the ACA device 505 to avoid the subsequent contention interval 310-2. For example, the ACA device 505 may refrain from transmitting during the subsequent contention interval 310-2. Similarly, the ACA device 505 may coordinate one or more communications of the ACA device 505 to avoid a first contention interval 310-1 in which the signal 425 is received. In this way, the ACA device 505 may avoid interfering with contention for access to the channel by one or more NR-SS devices 405.

In some aspects, the signal 425 may identify the subsequent CRC interval 315-2, such as by identifying a starting location and an ending location (e.g., in time) of the subsequent CRC interval 315-2. In some aspects, the ACA device 505 may coordinate (e.g., configure) one or more communications of the ACA device 505 to avoid the subsequent CRC interval 315-2. For example, the ACA device 505 may refrain from transmitting during the subsequent CRC interval 315-2. Similarly, the ACA device 505 may coordinate one or more communications of the ACA device 505 to avoid a first CRC interval 315-1 of a first channel access interval 305-1 in which the signal 425 is received. In this way, the ACA device 505 may avoid interfering with coordinated rate control operations performed by one or more NR-SS devices 405 that have gained access to the channel during a channel access interval 305.

In some aspects, the signal 425 may identify the subsequent transmission opportunity 320-2, such as by identifying a starting location and an ending location (e.g., in time) of the subsequent transmission opportunity 320-2. In some aspects, the ACA device 505 may coordinate (e.g., configure) one or more communications of the ACA device 505 to avoid collision with one or more NR-SS communications in the subsequent transmission opportunity 320-2. For example, the ACA device 505 may perform a listen-before-talk procedure during the subsequent contention interval 310-2, may determine whether the channel is available or busy based at least in part on channel occupancy information (or lack thereof) communicated during the subsequent contention interval 310-2 (e.g., in a subsequent signal 425), and may selectively communicate during the subsequent transmission opportunity 320-2 based at least in part on the channel occupancy information.

For example, if the channel occupancy information indicates that the channel is not available, then the ACA device 505 may refrain from transmitting during the subsequent transmission opportunity 320-2. However, if the channel occupancy information indicates that the channel is available, then the ACA device 505 may opportunistically communicate during the subsequent transmission opportunity 320-2. Similarly, the ACA device 505 may coordinate one or more communications of the ACA device 505 to avoid collision with NR-SS communications in the first transmission opportunity 320-1 of a first channel access interval 305-1 in which the signal 425 is received. For example, the signal 425 may include channel occupancy information for the first transmission opportunity 320-1, and the ACA device 505 may use the channel occupancy information to determine whether to communicate during the first transmission opportunity 320-1. In this way, the ACA device 505 may avoid interfering with NR-SS communications during channel access intervals 305 in which the NR-SS communications have high priority.

In some aspects, the ACA device 505 may configure a contention window for ACA communications based at least in part on information indicated in the signal 425. For example, the ACA device 505 may configure the contention window to occur immediately after the contention interval 310, immediately after the CRC interval 315, immediately after the transmission opportunity 320, during the low priority interval 415, and/or the like. In this way, the ACA device 505 may reduce interference with NR-SS communications during the channel access interval 305 in which NR-SS communications receive high priority.

As shown by reference number 525, in some aspects, the ACA device 505 may configure communications to avoid a contention interval (CI) 310 and a CRC interval 315, but may communicate during a transmission opportunity 320 if channel occupancy information, transmitted in the contention interval 310, indicates that the channel is clear during the transmission opportunity 320. In this way, the ACA device 505 may respect the priority of NR-SS communications during the channel access interval 305, may avoid interfering with contention procedures and CRC procedures of NR-SS, and may opportunistically transmit or receive ACA communications during the transmission opportunity 320 if the channel is available during the transmission opportunity 320 of the channel access interval 305.

As shown by reference number 530, in some aspects, the ACA device 505 may configure communications to avoid a contention interval (CI) 310, a CRC interval 315, and a transmission opportunity 320 if channel occupancy information, transmitted in the contention interval 310, indicates that the channel is not clear during the transmission opportunity 320. In this way, the ACA device 505 may respect the priority of NR-SS communications during the channel access interval 305, may avoid interfering with contention procedures and CRC procedures of NR-SS, may avoid collisions with NR-SS communications transmitted in the transmission opportunity 320, and may transmit or receive ACA communications during the low priority interval 415 if the channel is not available during the transmission opportunity 320 of the channel access interval 305.

As indicated above, FIG. 5 is provided as an example. Other examples may differ from what is described with regard to FIG. 5.

FIG. 6 is a diagram illustrating an example process 600 performed, for example, by a device, in accordance with various aspects of the present disclosure. Example process 600 is an example where a device (e.g., base station 110, UE 120, NR-SS device 140, NR-SS device 405, and/or the like) performs operations associated with coexistence between synchronous and/or asynchronous channel access systems.

As shown in FIG. 6, in some aspects, process 600 may include selecting a plurality of channel access intervals during which the device is associated with a priority condition relative to another device for communications by the device, wherein each of the plurality of channel access intervals includes a respective contention interval and a respective transmission opportunity (block 610). For example, the device (e.g., using controller/processor 240, controller/processor 280, and/or the like) may select a plurality of channel access intervals during which the device is associated with a priority condition relative to another device (e.g., has high priority) for communications by the device (e.g., NR-SS communications and/or the like) as described above in connection with FIG. 4. In some aspects, each of the plurality of channel access intervals includes a respective contention interval and a respective transmission opportunity.

As further shown in FIG. 6, in some aspects, process 600 may include transmitting, during a contention interval of a first channel access interval of the plurality of channel access intervals, a signal that includes: channel occupancy information for the device for a first transmission opportunity of the first channel access interval, and information that identifies at least a portion of one or more subsequent channel access intervals, of the plurality of channel access intervals, associated with the device (block 620). For example, the device (e.g., using transmit processor 220, TX MIMO processor 230, MOD 232, antenna 234, controller/processor 240, antenna 252, MOD 254, transmit processor 264, TX MIMO processor 266, controller/processor 280, and/or the like) may transmit, during a contention interval of a first channel access interval of the plurality of channel access intervals, a signal that includes: channel occupancy information for the device for a first transmission opportunity of the first channel access interval, and information that identifies at least a portion of one or more subsequent channel access intervals, of the plurality of channel access intervals, associated with the device, as described above in connection with FIG. 4.

Process 600 may include additional aspects, such as any single aspect or any combination of aspects described below and/or in connection with one or more other processes described elsewhere herein.

In a first aspect, the signal is configured to be decodable by one or more first devices that use a spectrum sharing technology to communicate and one or more second devices that use an asynchronous channel access technology to communicate. In a second aspect, alone or in combination with the first aspect, the asynchronous channel access technology includes at least one of a wireless local area network (WLAN) technology, a licensed-assisted access (LAA) technology, a Long Term Evolution in unlicensed spectrum (LTE-U) technology, or a New Radio in unlicensed spectrum (NR-U) technology. In a third aspect, alone or in combination with any one or more of the first and second aspects, the spectrum sharing technology is associated with a New Radio radio access technology.

In a fourth aspect, alone or in combination with any one or more of the first through third aspects, the plurality of channel access intervals occur with a periodicity, and the periodicity is indicated in the signal. In a fifth aspect, alone or in combination with any one or more of the first through fourth aspects, the one or more subsequent channel access intervals include a single subsequent channel access interval that occurs closest in time subsequent to the first channel access interval.

In a fifth aspect, alone or in combination with any one or more of the first through fourth aspects, the plurality of channel access intervals are noncontiguous in time, and each pair of consecutive channel access intervals, of the plurality of channel access intervals, is separated by a low priority interval during which the device is not associated with the priority condition. In a sixth aspect, alone or in combination with any one or more of the first through fifth aspects, the device is configured to attempt to access a channel, during the low priority interval, after a maximum contention window time, associated with asynchronous channel access during the low priority interval, has elapsed. In a seventh aspect, alone or in combination with any one or more of the first through sixth aspects, the device is configured to refrain from attempting to access the channel before the maximum contention window time has elapsed. In an eighth aspect, alone or in combination with any one or more of the first through seventh aspects, the device is configured to attempt to access a channel, during the low priority interval, using a higher clear channel assessment deferral value than an asynchronous channel access device.

In a ninth aspect, alone or in combination with any one or more of the first through eighth aspects, the signal further identifies a first coordinated rate control interval of the first channel access interval. In a tenth aspect, alone or in combination with any one or more of the first through ninth aspects, the information that identifies at least the portion of the one or more subsequent channel access intervals includes information that identifies at least one of: one or more subsequent contention intervals included in the one or more subsequent channel access intervals, one or more subsequent coordinated rate control intervals included in the one or more subsequent channel access intervals, one or more subsequent transmission opportunities included in the one or more subsequent channel access intervals, or a combination thereof.

In an eleventh aspect, alone or in combination with any one or more of the first through tenth aspects, the information that identifies at least the portion of the one or more subsequent channel access intervals includes information that identifies the one or more subsequent contention intervals, and the information that identifies at least the portion of the one or more subsequent channel access intervals excludes information that identifies the one or more subsequent coordinated rate control intervals and the one or more subsequent transmission opportunities. In a twelfth aspect, alone or in combination with any one or more of the first through eleventh aspects, the information that identifies at least the portion of the one or more subsequent channel access intervals includes information that identifies the one or more subsequent coordinated rate control intervals and the one or more subsequent transmission opportunities, and the information that identifies at least the portion of the one or more subsequent channel access intervals excludes information that identifies the one or more subsequent contention interval.

In a thirteenth aspect, alone or in combination with any one or more of the first through twelfth aspects, the signal includes at least one of: a modified request to send (RTS) signal, a modified clear to send (CTS) signal, a modified clear to send to self (CTS2S) signal, or a combination thereof.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a device, in accordance with various aspects of the present disclosure. Example process 700 is an example where a device (e.g., base station 110, UE 120, ACA device 150, ACA device 505, and/or the like) performs operations associated with coexistence between synchronous and/or asynchronous channel access systems.

As shown in FIG. 7, in some aspects, process 700 may include receiving, during a first contention interval of a first channel access interval of a plurality of channel access intervals during which the asynchronous channel access device is not associated with a priority condition relative to a spectrum sharing device for communications by the asynchronous channel access device, a signal that includes: channel occupancy information for a spectrum sharing device for a first transmission opportunity of the first channel access interval, and information that identifies at least a portion of a subsequent channel access interval of the plurality of channel access intervals (block 710). For example, the device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive, during a first contention interval of a first channel access interval of a plurality of channel access intervals during which the asynchronous channel access device is not associated with a priority condition relative to a spectrum sharing device (e.g., has low priority relative to the spectrum sharing device) for communications by the asynchronous channel access device (e.g., asynchronous channel access communications), a signal that includes: channel occupancy information for an NR-SS device for a first transmission opportunity of the first channel access interval, and information that identifies at least a portion of a subsequent channel access interval of the plurality of channel access intervals, as described above in connection with FIGS. 4-5.

As further shown in FIG. 7, in some aspects, process 700 may include coordinating one or more communications of the asynchronous channel access device to end prior to a start of the subsequent channel access interval (block 720). For example, the device (e.g., using controller/processor 240, controller/processor 280, and/or the like) may coordinate one or more communications of the asynchronous channel access device to end prior to a start of the subsequent channel access interval, as described above in connection with FIG. 5.

Process 700 may include additional aspects, such as any single aspect or any combination of aspects described below and/or in connection with one or more other processes described elsewhere herein.

In a first aspect, the signal includes information that identifies at least a portion of multiple subsequent channel access intervals of the plurality of channel access intervals, and the asynchronous channel access device is configured to coordinate one or more communications of the asynchronous channel access device to end prior to respective starts of each of the multiple subsequent channel access intervals. In a second aspect, alone or in combination with the first aspect, the one or more communications are coordinated to avoid a subsequent contention interval of the subsequent channel access interval. In a third aspect, alone or in combination with the first aspect and/or the second aspect, the one or more communications are coordinated to avoid at least one of: a first coordinated rate control interval included in the first channel access interval, a subsequent coordinated rate control interval included in the subsequent channel access interval, or a combination thereof. In a fourth aspect, alone or in combination with any one or more of the first through third aspects, at least one of the first coordinated rate control interval or the subsequent coordinated rate control interval is indicated in the signal.

In a fifth aspect, alone or in combination with any one or more of the first through fourth aspects, the one or more communications are coordinated to avoid collision with one or more communications of the spectrum sharing device, in the first transmission opportunity, indicated in the signal. In a sixth aspect, alone or in combination with any one or more of the first through fifth aspects, the signal is configured to be decodable by one or more spectrum sharing devices that use a spectrum sharing technology to communicate, and one or more asynchronous channel access devices that use an asynchronous channel access technology to communicate. In a seventh aspect, alone or in combination with any one or more of the first through sixth aspects, the asynchronous channel access technology includes at least one of a wireless local area network (WLAN) technology, a licensed-assisted access (LAA) technology, a Long Term Evolution in unlicensed spectrum (LTE-U) technology, or a New Radio in unlicensed spectrum (NR-U) technology. In an eighth aspect, alone or in combination with any one or more of the first through seventh aspects, the spectrum sharing technology is associated with a New Radio radio access technology.

In a ninth aspect, alone or in combination with any one or more of the first through eighth aspects, the plurality of channel access intervals occur with a periodicity, and the periodicity is indicated in the signal. In a tenth aspect, alone or in combination with any one or more of the first through ninth aspects, the subsequent channel access interval is a single subsequent channel access interval that occurs closest in time subsequent to the first channel access interval. In an eleventh aspect, alone or in combination with any one or more of the first through tenth aspects, the plurality of channel access intervals are noncontiguous in time, and each pair of consecutive channel access intervals, of the plurality of channel access intervals, is separated by an interval during which the asynchronous channel access device has high priority for asynchronous channel access communications.

In a twelfth aspect, alone or in combination with any one or more of the first through eleventh aspects, the information that identifies at least the portion of the subsequent channel access interval includes information that identifies at least one of: a subsequent contention interval included in the subsequent channel access interval, a subsequent coordinated rate control interval included in the subsequent channel access interval, a subsequent transmission opportunity included in the subsequent channel access interval, or a combination thereof. In a thirteenth aspect, alone or in combination with any one or more of the first through twelfth aspects, the information that identifies at least the portion of the subsequent channel access interval includes information that identifies the subsequent contention interval. In a fourteenth aspect, alone or in combination with any one or more of the first through thirteenth aspects, the information that identifies at least the portion of the subsequent channel access interval excludes information that identifies the subsequent coordinated rate control interval and the subsequent transmission opportunity. In a fifteenth aspect, alone or in combination with any one or more of the first through fourteenth aspects, the information that identifies at least the portion of the subsequent channel access interval includes information that identifies the subsequent coordinated rate control interval and the subsequent transmission opportunity. In a sixteenth aspect, alone or in combination with any one or more of the first through fifteenth aspects, the information that identifies at least the portion of the subsequent channel access interval excludes information that identifies the subsequent contention interval.

In a seventeenth aspect, alone or in combination with any one or more of the first through sixteenth aspects, the signal includes at least one of: a modified request to send (RTS) signal, a modified clear to send (CTS) signal, a modified clear to send to self (CTS2S) signal, or a combination thereof. In an eighteenth aspect, alone or in combination with any one or more of the first through seventeenth aspects, the asynchronous channel access communications include at least one of wireless local area network (WLAN) communications, licensed-assisted access (LAA) communications, Long Term Evolution in unlicensed spectrum (LTE-U) communications, or New Radio in unlicensed spectrum (NR-U) communications.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a device, comprising:
   selecting a plurality of channel access intervals during which the device is associated with a priority condition relative to another device for communications by the device, wherein each of the plurality of channel access intervals includes a respective contention interval and a respective transmission opportunity;
   transmitting, during a contention interval of a first channel access interval of the plurality of channel access intervals, a signal that includes:
      channel occupancy information for the device for a first transmission opportunity of the first channel access interval, and
      information that identifies at least a portion of one or more subsequent channel access intervals, of the plurality of channel access intervals, associated with the device; and
   wherein the plurality of channel access intervals occur with a periodicity, and wherein the periodicity is indicated in the signal.

2. The method of claim 1, wherein the signal is configured to be decodable by one or more first devices that use a spectrum sharing technology to communicate and one or more second devices that use an asynchronous channel access technology to communicate.

3. The method of claim 2, wherein the asynchronous channel access technology includes at least one of a wireless local area network (WLAN) technology, a licensed-assisted access (LAA) technology, a Long Term Evolution in unlicensed spectrum (LTE-U) technology, or a New Radio in unlicensed spectrum (NR-U) technology.

4. The method of claim 2, wherein the spectrum sharing technology is associated with a New Radio radio access technology.

5. The method of claim 1, wherein the one or more subsequent channel access intervals includes a single subsequent channel access interval that occurs closest in time subsequent to the first channel access interval.

6. A method of wireless communication performed by a device, comprising:
   selecting a plurality of channel access intervals during which the device is associated with a priority condition relative to another device for communications by the device, wherein each of the plurality of channel access intervals includes a respective contention interval and a respective transmission opportunity;
   transmitting, during a contention interval of a first channel access interval of the plurality of channel access intervals, a signal that includes:
      channel occupancy information for the device for a first transmission opportunity of the first channel access interval, and
      information that identifies at least a portion of one or more subsequent channel access intervals, of the plurality of channel access intervals, associated with the device;
   wherein the plurality of channel access intervals are noncontiguous in time, and wherein each pair of consecutive channel access intervals, of the plurality of channel access intervals, is separated by a low priority interval during which the device is not associated with the priority condition.

7. The method of claim 6, further comprising:
   attempting to access a channel, during the low priority interval, after a maximum contention window time, associated with asynchronous channel access during the low priority interval, has elapsed.

8. The method of claim 6, further comprising:
   attempting to access a channel, during the low priority interval, using a higher clear channel assessment deferral value than an asynchronous channel access device.

9. A method of wireless communication performed by a device, comprising:
   selecting a plurality of channel access intervals during which the device is associated with a priority condition relative to another device for communications by the device, wherein each of the plurality of channel access intervals includes a respective contention interval and a respective transmission opportunity;
   transmitting, during a contention interval of a first channel access interval of the plurality of channel access intervals, a signal that includes:
      channel occupancy information for the device for a first transmission opportunity of the first channel access interval, and
      information that identifies at least a portion of one or more subsequent channel access intervals, of the plurality of channel access intervals, associated with the device;
   and wherein the signal further identifies a first coordinated rate control interval of the first channel access interval.

10. The method of claim 1, wherein the information that identifies at least the portion of the one or more subsequent channel access intervals includes information that identifies at least one of:
   one or more subsequent contention intervals included in the one or more subsequent channel access intervals,
   one or more subsequent coordinated rate control intervals included in the one or more subsequent channel access intervals,
   one or more subsequent transmission opportunities included in the one or more subsequent channel access intervals, or
   a combination thereof.

11. The method of claim 10, wherein the information that identifies at least the portion of the one or more subsequent channel access intervals includes information that identifies the one or more subsequent contention intervals, and wherein the information that identifies at least the portion of the one or more subsequent channel access intervals excludes information that identifies the one or more subsequent coordinated rate control intervals and the one or more subsequent transmission opportunities.

12. The method of claim 1, wherein the signal includes at least one of:
   a modified request to send signal,
   a modified clear to send signal,
   a modified clear to send to self signal, or
   a combination thereof.

13. A method of wireless communication performed by an asynchronous channel access device, comprising:
   receiving, during a first contention interval of a first channel access interval of a plurality of channel access intervals during which the asynchronous channel access device is not associated with a priority condition relative to a spectrum sharing device for communications by the asynchronous channel access device, a signal that includes:
      channel occupancy information for the spectrum sharing device for a first transmission opportunity of the first channel access interval, and
      information that identifies at least a portion of a subsequent channel access interval of the plurality of channel access intervals; and
   coordinating one or more communications of the asynchronous channel access device to end prior to a start of the subsequent channel access interval; and
   wherein the plurality of channel access intervals occur with a periodicity, and wherein the periodicity is indicated in the signal.

14. The method of claim 13, wherein the signal includes information that identifies at least a portion of multiple subsequent channel access intervals of the plurality of channel access intervals, and wherein the asynchronous channel access device is configured to coordinate one or more communications of the asynchronous channel access device to end prior to respective starts of each of the multiple subsequent channel access intervals.

15. The method of claim 13, wherein the one or more communications are coordinated to avoid a subsequent contention interval of the subsequent channel access interval.

16. A method of wireless communication performed by an asynchronous channel access device, comprising:

receiving, during a first contention interval of a first channel access interval of a plurality of channel access intervals during which the asynchronous channel access device is not associated with a priority condition relative to a spectrum sharing device for communications by the asynchronous channel access device, a signal that includes:
  channel occupancy information for the spectrum sharing device for a first transmission opportunity of the first channel access interval, and
  information that identifies at least a portion of a subsequent channel access interval of the plurality of channel access intervals; and
coordinating one or more communications of the asynchronous channel access device to end prior to a start of the subsequent channel access interval;
wherein the one or more communications are coordinated to avoid at least one of:
a first coordinated rate control interval included in the first channel access interval,
a subsequent coordinated rate control interval included in the subsequent channel access interval, or
a combination thereof.

17. The method of claim 16, wherein at least one of the first coordinated rate control interval or the subsequent coordinated rate control interval is indicated in the signal.

18. The method of claim 13, wherein the one or more communications are coordinated to avoid collision with one or more communications of the spectrum sharing device, in the first transmission opportunity, indicated in the signal.

19. The method of claim 13, wherein the signal is configured to be decodable by one or more spectrum sharing devices that use a spectrum sharing technology to communicate and one or more asynchronous channel access devices that use an asynchronous channel access technology to communicate.

20. The method of claim 19, wherein the asynchronous channel access technology includes at least one of a wireless local area network (WLAN) technology, a licensed-assisted access (LAA) technology, a Long Term Evolution in unlicensed spectrum (LTE-U) technology, or a New Radio in unlicensed spectrum (NR-U) technology.

21. The method of claim 19, wherein the spectrum sharing technology is associated with a New Radio radio access technology.

22. The method of claim 13, wherein the subsequent channel access interval is a single subsequent channel access interval that occurs closest in time subsequent to the first channel access interval.

23. A method of wireless communication performed by an asynchronous channel access device, comprising:
receiving, during a first contention interval of a first channel access interval of a plurality of channel access intervals during which the asynchronous channel access device is not associated with a priority condition relative to a spectrum sharing device for communications by the asynchronous channel access device, a signal that includes:
  channel occupancy information for the spectrum sharing device for a first transmission opportunity of the first channel access interval, and
  information that identifies at least a portion of a subsequent channel access interval of the plurality of channel access intervals; and
coordinating one or more communications of the asynchronous channel access device to end prior to a start of the subsequent channel access interval; and wherein the plurality of channel access intervals are noncontiguous in time, and wherein each pair of consecutive channel access intervals, of the plurality of channel access intervals, is separated by an interval during which the asynchronous channel access device is associated with the priority condition for asynchronous channel access communications.

24. The method of claim 13, wherein the information that identifies at least the portion of the subsequent channel access interval includes information that identifies at least one of:
  a subsequent contention interval included in the subsequent channel access interval,
  a subsequent coordinated rate control interval included in the subsequent channel access interval,
  a subsequent transmission opportunity included in the subsequent channel access interval, or
  a combination thereof.

25. The method of claim 13, wherein the signal includes at least one of:
  a modified request to send (RTS) signal,
  a modified clear to send (CTS) signal,
  a modified clear to send to self (CTS2S) signal, or
  a combination thereof.

26. The method of claim 13, wherein the asynchronous channel access communications include at least one of wireless local area network (WLAN) communications, licensed-assisted access (LAA) communications, Long Term Evolution in unlicensed spectrum (LTE-U) communications, or New Radio in unlicensed spectrum (NR-U) communications.

27. A device for wireless communication, comprising:
a memory; and
one or more processors operatively coupled to the memory, the memory and the one or more processors configured to:
  select a plurality of channel access intervals during which the device is associated with a priority condition relative to another device for communications by the device, wherein each of the plurality of channel access intervals includes a respective contention interval and a respective transmission opportunity; and
  transmit, during a contention interval of a first channel access interval of the plurality of channel access intervals, a signal that includes:
    channel occupancy information for the device for a first transmission opportunity of the first channel access interval, and
    information that identifies at least a portion of one or more subsequent channel access intervals, of the plurality of channel access intervals, associated with the device and
      wherein the plurality of channel access intervals are configured to occur with a periodicity, and wherein the device is configured to indicate the periodicity in the signal.

28. An asynchronous channel access device for wireless communication, comprising:
a memory; and
one or more processors operatively coupled to the memory, the memory and the one or more processors configured to:
  receive, during a first contention interval of a first channel access interval of a plurality of channel access intervals during which the asynchronous channel access device is not associated with a priority condition for communications by the asynchronous channel access device, a signal that includes:
  channel occupancy information for a spectrum sharing device for a first transmission opportunity of the first channel access interval, and
  information that identifies at least a portion of a subsequent channel access interval of the plurality of channel access intervals; and
coordinate one or more communications of the asynchronous channel access device to end prior to a start of the subsequent channel access interval; and
wherein the plurality of channel access intervals are configured to occur with a periodicity, and wherein the signal is configured to indicate the periodicity.

\* \* \* \* \*